(12) United States Patent
Tsuji et al.

(10) Patent No.: US 6,534,119 B1
(45) Date of Patent: Mar. 18, 2003

(54) WIRE AND A PROCESS FOR ITS PRODUCTION

(75) Inventors: Yoichiro Tsuji, Ichihara (JP); Tadashi Aoki, Ichihara (JP); Fumio Kageyama, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/701,750

(22) PCT Filed: Apr. 13, 2000

(86) PCT No.: PCT/JP00/02415
§ 371 (c)(1),
(2), (4) Date: Dec. 4, 2000

(87) PCT Pub. No.: WO00/65609
PCT Pub. Date: Nov. 2, 2000

(30) Foreign Application Priority Data

Apr. 22, 1999 (JP) ............................................. 11-115427
Apr. 22, 1999 (JP) ............................................. 11-115493

(51) Int. Cl.[7] .................................................. B05D 5/12
(52) U.S. Cl. ....................... 427/117; 427/118; 427/120; 526/348; 526/348.4; 526/348.6
(58) Field of Search ................................. 427/117, 118, 427/120; 526/348, 348.4, 348.6

(56) References Cited

U.S. PATENT DOCUMENTS

| 4,668,752 A | 5/1987 | Tominari et al. |
| 5,883,205 A | 3/1999 | Tsutsui et al. |
| 6,329,465 B1 * | 12/2001 | Takahashi et al. .......... 525/191 |

FOREIGN PATENT DOCUMENTS

| JP | 4-22990 | 8/1992 |
| JP | 6-52719 | 2/1994 |
| JP | 8-73670 | 3/1996 |
| JP | 09-25373 | 1/1997 |
| JP | 11-29616 | * 2/1999 |
| JP | 11-029616 | 2/1999 |

* cited by examiner

*Primary Examiner*—David W. Wu
*Assistant Examiner*—R. Rabago
(74) *Attorney, Agent, or Firm*—Birch, Stewart, Kolasch & Birch, LLP

(57) ABSTRACT

A wire showing satisfactory electrical insulation, mechanical strength, wear resistance, crosslinking properties and appearance may be obtained by coating a conductor with an ethylene/α-olefin copolymer whose density, melt flow rate, decane soluble matter content, melting point and melt tension are controlled to particular ranges. The copolymer may be used singly or in combination with high-pressure low-density polyethylene. Such copolymer provides a coated layer showing tensile strength of not less than 15 MPa, tensile elongation of not less than 400% and taper wear amount of not more than 15 mg. Furthermore, if the resin pressure in the extruder is adjusted to a particular range, high-speed extrusion becomes possible with a smooth apparent coated layer.

15 Claims, No Drawings

WIRE AND A PROCESS FOR ITS PRODUCTION

This application is the national phase under 35 U.S.C. §371 of PCT International Application No. PCT/JP00/02415 which has an International filing date of Apr. 13, 2000, which designated the United States of America.

FIELD OF THE INVENTION

The invention relates to a wire coated with an insulating material comprising an ethylene/α-olefin copolymer and a process for producing it. More specifically, the invention relates to a wire coated with an insulating material having excellent physical properties such as mechanical properties, wear resistance, heat stability and crosslinking properties and an excellent appearance, and to a manufacturing process therefor showing excellent extrusion-coating characteristics.

BACKGROUND OF THE INVENTION

In the past, polyethylene has been used for an insulating material for many of the power cables and other electrical wires, and its excellent electrical insulating properties have been evaluated highly. However, it has been said that when such polyethylene is used in an environment in which there is much moisture, a water tree occurs in the insulating material layer, causing a decline in electrical insulating properties. Because of this, among other reasons, an improvement in its physical properties has been called for so that the polyethylene may be used as a satisfactory insulating material.

In recent years, a new polyethylene manufactured by use of a metallocene catalyst has come on the scene, and a study is under way to apply such new polyethylene to insulating material use. Japanese Laid-Open Patent Publication No. 509905/1994 and Japanese Laid-Open Patent Publication No. 312118/1995 disclose that such new polyethylene is capable of preventing from the occurrence of a water tree to a significant extent, thus improving its electrical insulating properties. However, since the new polyethylene has a narrow molecular weight distribution, it does not show satisfactory extrudability. Because of this, when the polyethylene is actually used in forming a thick-walled coating layer, the surface of the coating layer thus formed roughens, sometimes damaging the appearance. This has called for a further improvement in its extrudability.

DESCRIPTION OF THE INVENTION

Accordingly it is an object of the invention to solve the problems experienced by the conventional technology as mentioned above and to provide a wire which has a coating layer having a satisfactory appearance, while retaining the electrical insulating properties, mechanical strength, wear resistance and crosslinking properties inherently possessed by polyethylene.

Another object of the invention is to provide a process for producing a wire having such coating layer.

The invention relates to a wire whose conductor or conductor shielding layer is coated with an insulating material comprising a copolymer of an ethylene and an α-olefin having 3 to 20 carbon atoms, wherein the ethylene/α-olefin copolymer (a) meets following conditions (A) to (D):

(A) a density (d) is 0.880 to 0.950 (g/cm$^3$);
(B) a melt flow rate (MFR) is 0.01 to 20 (g/10 minutes);
(C) a relationship between a decane soluble matter content (W (wt %)) at 23° C. and the density is:

when MFR$\leq$10 (g/10 minutes), $$W<80\times\exp\{-100(d-0.88)\}+0.1,$$

when MFR>10 (g/10 minutes), $$W<80\times(MFR-9)0.26\exp\{-100(d-0.88)\}+0.1; \text{ and}$$

(D) a relationship between a temperature (Tm (° C.)) at a position of the highest peak of an endothermic curve as measured by a differential scanning calorimeter (DSC) and the density (d) is:

$$Tm<400\times d-244.$$

Further, the insulating material may be a composition comprising the ethylene/α-olefin copolymer (a) and another ethylene-based polymer. For example, if a composition obtained by compounding a high-pressure low-density polyethylene to the ethylene/α-olefin copolymer (a) is used as such composition, the composition comprising 60 to 97 wt % of the ethylene/α-olefin copolymer (a) and 3 to 40 wt % of the high-pressure low-density polyethylene is preferable.

Furthermore, the insulating material may further comprise a crosslinking agent such as a peroxide or a silane compound. If the insulating material crosslinked with such crosslinking agent has following physical properties, it is preferable as the wire coating layer:

(1) a tensile strength of not less than 15 MPa;
(2) a tensile elongation of not less than 400%; and
(3) a wear amount of not more than 15 mg as determined by a taper wear test method.

Moreover, the invention relates to a process for producing the wire, wherein a relationship between a resin pressure P (kg/cm$^2$) and a resin temperature T (° C.), an extrusion rate K (kg/hour), a lip cross-section area of extruder A (cm$^2$) and a melt flow rate of resin MFR (g/10 minutes) is under following conditions when the insulating material is extrusion-coated onto a conductor or a conductor shielding layer:

$$100\times\{K/(MFR)^{1.5}/(T-120)/A\}^{0.2}\leq P\leq 1000\times\{K/(MFR)^{1.5}/(T-120)/A\}^{0.2}$$

DETAILED DESCRIPTION OF THE PREFERRED EMBODIMENTS

The invention relates to a wire coated with an insulating material comprising an ethylene/α-olefin copolymer (a) by extrusion-coating the insulating material onto a conductor or a conductor shielding layer such as a semiconductor layer, and a process for producing it. The followings are given specific explanations of each constitution of such wire and process.

Ethylene/α-olefin Copolymer (a)

This copolymer is a polymer comprised primarily of an ethylene and an α-olefin having 3 to 20 carbon atoms. Specific examples of such α-olefin include propylene, 1-butene, 1-pentene, 1-hexene, 4-methyl-1-pentene, 1-octene, 1-decene and 1-dodecene.

The ethylene content of the copolymer is normally 94 to 99 mol %, preferably 96 to 98 mol %, and the comonomer α-olefin content is normally 1 to 6 mol %, preferably 2 to 4 mol %. This copolymer is formed by random-copolymerizing the ethylene and α-olefin whose contents are in the ranges shown above.

Here, the ethylene and α-olefin contents can be measured by use of $^{13}$C-NMR. Specifically, the composition can be determined normally by measuring $^{13}$C-NMR spectrum of a sample obtained by dissolving approximately 200 mg of the copolymer uniformly in 1 ml of hexachlorobutadiene in a test tube 10 mmϕ under the conditions of the test temperature of 120° C., test frequency of 25.05 MHz, spectrum width of 1500 Hz, pulse repeating time of 4.2 sec. and pulse width of 6 μsec.

The ethylene/α-olefin copolymer (a) constituting the insulating material allows a satisfactory coating layer to be formed when (A) its density, (B) its melt flow rate (MFR), (C) the relationship between the decane soluble matter content and density, and (D) the relationship between the temperature at the position of the highest peak of the endothermic curve as measured by use of a differential scanning calorimeter (DSC) and density are in the certain ranges explained below.

(A) The density of the copolymer is in the range of 0.880 to 0.950 (g/cm$^3$), preferably 0.880 to 0.940 (g/cm$^3$), more preferably 0.890 to 0.930 (g/cm$^3$). It is convenient to impart flexibility to the wire coating layer if the density is in this range. Here, the density is measured at 23±0.1° C. by use of a density gradient tube in accordance with ASTM D-1505 after subjecting the strand, which is obtained by the operation of measurement of the melt flow rate, to heat treatment at 120° C. for one hour and then slowly cooling it to the room temperature for one hour.

(B) Moreover, the value of the MFR of the copolymer as measured at 190° C. and under a load of 2.16 kg in accordance with ASTM D-1238 is 0.01 to 20 (g/10 minutes), preferably 0.1 to 15 (g/10 minutes), more preferably 0.2 to 11 (g/10 minutes). It is preferable that the MFR should be in this range, because the coating layer having a satisfactory appearance may be obtained at high extrusion molding speed in the range of MFR.

(C) Furthermore, the copolymer shows the relationship between the decane soluble matter content (W (wt %)) at 23° C. and density (d) which meets the following conditions:

when MFR≦10 (g/10 minutes), $W<80\times\exp\{-100(d-0.88)\}+0.1$, preferably, $W<60\times\exp\{-100(d-0.88)\}+0.1$, more preferably, $W<40\times\exp\{-100(d-0.88)\}+0.1$, when MFR>10 (g/10 minutes), $W<80\times(MFR-9)^{0.26}\times\exp\{-100(d-0.88)\}+0.1$.

If the relationship among W, MFR and d are under the conditions as shown above, the copolymer has a low content of low molecular weight matter, making it possible to prevent the whitening phenomenon from occurring due to the bleeding-out of such matter onto the coating layer surface.

The decane soluble matter content (W) can be measured by the method as described below. Approximately 3 g of the sample are added to 450 ml of n-decane and dissolved at 145° C. After that, the liquid is cooled to 23° C. and filtered for the removal of the n-decane insoluble matter. The n-decane soluble matter is recovered from the filtrate. The soluble and insoluble matter contents are measured by performing these operations, and the W value is calculated by the following formula:

W={(n-decane soluble matter content)/(n-decane soluble matter content+insoluble matter content)}×100 (wt %).

(D) On the other hand, the relationship between the temperature (Tm (° C.)) at the position of the highest peak of the endothermic curve as measured by use of a differential scanning calorimeter (DSC) and density (d) is:

$Tm<400\times d-244$, preferably $Tm<400\times d-248$, more preferably $Tm<400\times d-249$.

If Tm and d are in the relationship shown above, it is estimated the copolymer has a narrow composition distribution, and the copolymer makes it possible to form a coating layer having excellent mechanical strength such as wear resistance.

Here, in measuring the temperature at the highest peak position by use of DSC, Model DSC-7, available from Parkin Elmer, was used. Specifically, approximately 5 mg of the sample were packed into an aluminum pan and heated to 200° C. at a rate of 10° C./minute. When the temperature reached 200° C., it was kept at that level for 5 minutes, lowered to room temperature at a rate of 20° C./minute, and the endothermic curve was obtained by raising again at a rate of 10° C./minute. The temperature corresponding to the highest peak was determined from the endothermic curve. Further, the ethylene/α-olefin copolymer (a) may be a copolymer having one peak in the endothermic curve as obtained by DSC or a copolymer having not less than one peak in addition to the highest peak in the endothermic curve.

The ethylene/α-olefin copolymer (a) meeting the aforesaid conditions (A) through (D) provides the insulating material having excellent mechanical strength and wear resistance and satisfactory extrudability. In addition, it is desirable that (E) the molecular weight distribution, (F) the insoluble matter content as determined by Temperature Rising Elution Fractionation Test, or (G) the relationship between melt tension and MFR of the copolymer should be in the ranges as shown below. The reason is that in that case, the ethylene/α-olefin copolymer may provide an insulating material which has a satisfactory appearance, while retaining the physical properties as described above, and shows much more satisfactory extrudability.

(E) First, it is desirable that the copolymer should show its weight-average molecular weight (Mw)/number-average molecular weight (Mn) ratio (Mw/Mn) being in the range of 2.0 to 15. If the Mw/Mn value is in this range, the copolymer has a lower low-molecular-weight polymer content, which in turn will make it possible to keep the coating surface unsticky and imparts satisfactory extrudability.

Here, the Mw/Mn value was obtained by measuring the Mw and Mn values of the copolymer by use of GPC and calculating the ratio between them. The GPC was conducted at 140° C. by using GPC Model ALC-GPC-150C available from Waters Co., using PSK-GMH-HT available from Tosoh Corporation as the column, and using o-dichlorobenzene as the carrier.

(F) It is desirable that the copolymer should contain the matter which is not extracted below 100° C. as determined by the Temperature Rising Elution Fractionation Test (TREF) and the amount of such matter is not more than 10 wt %, preferably not more than 8 wt %. The copolymer containing such insoluble matter may show excellent crosslinking efficiency and tensile properties.

Here, the Temperature Rising Elution Fractionation Test (TREF) may be conducted by the method described in the Journal of Applied Polymer Science, Vol. 26, 4217–4231 (1981). By the method, the sample solution is brought into contact with the surface of an inactive support to form a thin polymer layer on the surface of the support, and the temperature is raised continuously or step by step so that polymer is slowly extracted into o-dichlorobenzene as the solvent.

(G) Furthermore, it is desirable that the melt tension (MT (g)) at 190° C. of the copolymer should be in the relationship with MFR (g/10 minutes) as described below. The formula of that relationship serves as an index that shows the length of the branches of the copolymer molecules, and either copolymer having short-chain branches or copolymer having long-chain branches may be used in the present invention.

In the first embodiment, where the copolymer molecules have short branches, the melt tension is in the following relationship:

$$MT \leq 2.2 \times MFR^{-0.84}$$

If MT and MFR are in the above relationship, the tension of melted resin becomes a value suitable for extrusion, which may prevent the occurrence of the sagging of the melted resin immediately after coming the extruder.

In the second embodiment, where the copolymer molecules have long branches, the melt tension is in the following relationship:

$$MT > 2.2 \times MFR^{-0.84}$$

preferably, $MT > 4.0 \times MFR^{-0.84}$.

If MT and MFR are in the above relationship, the resin has high melt tension and may show excellent extrusion-coating properties. Out of the copolymers meeting this condition, those copolymers in which long-chain branches having not less than 6 carbon atoms as determined by NMR measurement are present in the number of not less than 3, preferably not less than 4, per 1,000 carbon atoms are desirable.

Here, the melt tension is determined by measuring the stress at the time of stretching melted polymer at a constant rate. Under one example of such measuring method, resin pellets are fed to MT measuring equipment (available from Toyo Seiki Seisakusho), and the melt tension is measured under the following conditions: a resin temperature: 190° C.; extrusion rate: 15 mm/minute; take-up speed: 10 to 20 m/minute; nozzle diameter: 2.09 mmφ; and nozzle length: 8 mm.

The ethylene/α-olefin copolymer (a) meeting the conditions (A) through (G) as described above may provide a coating layer having excellent physical properties and show excellent extrusion coating properties. If the copolymer meets the condition of (H) a B value and (I) a relationship between a flowability index and the MFR as described below, the copolymer will provide more desirable wire coating layer.

(H) It is desirable that the B value of this copolymer, which is expressed by the general formula:

$$B = P_{OE}/(2 P_O \cdot P_E)$$

should be:

$1.00 \leq B$, preferably $1.01 \leq B \leq 1.50$, more preferably $1.01 \leq B \leq 1.30$.

In the above formula, $P_E$ represents the mol percent of the ethylene content; $P_O$ represents the mol percent of the α-olefin content; and $P_{OE}$ represents the mol percent of the ethylene-α-olefin linkage content out of the total dyad chains.

This B value is an index showing the situation of the monomer arrangement distribution along the copolymer chain. The index is calculated by determining $P_E$, $P_O$ and $P_{OE}$ in accordance with the reports of G. J. Ray (Macromolecules, 10, 773 (1977)), J. C. Randall (Macromolecules, 15, 353, (1982), J. Polymer Science, Polymer Physics Ed., 11, 275 (1973), and K. Kimura (Polymer, 25, 441 (1984)). It is found that as the B value increases, the copolymer has a smaller amount of the block-like linkage, a more uniform monomer arrangement distribution of ethylene and α-olefin, and a narrower monomer composition distribution.

Here, the B value can be calculated by determining $P_E$, $P_O$ and $P_{OE}$ from the $^{13}$C-NMR spectrum of the sample obtained by dissolving approximately 200 mg of the copolymer uniformly to 1 ml of hexachlorobutadiene in a test tube 10 mmφ in diameter. The measurement of the NMR spectrum is done normally under the following conditions: test temperature: 120° C., test frequency: 25.05 MHz, spectrum width: 1,500 Hz, filter width: 1,500 Hz; pulse repeating time: 4.2 sec., pulse width: 7 μsec.; and calculation times: 2,000 to 5,000 times.

(I) Furthermore, it is desirable that this copolymer should be in the following relationship between the flowability index (FI) as defined in terms of shear rate at the time of shear stress at 190° C. reaching $2.4 \times 10^6$ dyne/cm$^2$ and MFR:

$$FI < 75 \times MFR.$$

The copolymer meeting this condition of the relationship between FI and MFR may show good flowability when it is melted and satisfactory extrusion properties.

Here, the flowability index (FI) can be determined by measuring the stress at the time of extruding the copolymer through a capillary while varying the shear rate. As to the specific measurement method, resin pellets are fed in the flowability tester of the capillary type (available from Toyo Seiki Seisakusho), the resin temperature is set at 190° C., and the shear stress range is set to approximately $5 \times 10^4$ to $3 \times 10^6$ (dyne/cm$^2$). Depending on the MFR value of the resin used, the nozzle diameter is changed in the measurement of the stress as follows:

nozzle diameter is 1.0 mm, when $20 \geq MFR > 3$, nozzle diameter is 2.0 mm, when $3 \geq MFR > 0.8$, nozzle diameter is 3.0 mm, when $0.8 \geq MFR \geq 0.01$.

Followings are especially desirable embodiments of the ethylene/α-olefin copolymers (a) as described above.

The first desirable embodiment is the ethylene/α-olefin copolymer (a) being a polymer (hereinafter referred to as "M-1") meeting the following conditions (a) through (g):

(a) d is 0.880 to 0.940 (g/cm$^3$), preferably 0.890 to 0.930 (g/cm$^3$);

(b) MFR is 0.1 to 15 (g/10 minutes), preferably 0.2 to 11 (g/10 minutes);

(c) the relationship between W (wt %) at 23° C. and density (d) is as follows:
when MFR≤10 (g/10 minutes), $$W < 80 \times \exp\{-100(d-0.88)\} + 0.1,$$

preferably $W < 60 \times \exp\{-100(d-0.88)\} + 0.1$, when MFR>10 (g/10 minutes), $$W < 80 \times (MFR-9)^{0.26} \times \exp\{-100(d-0.88)\} + 0.1,$$

preferably $W < 60 \times (MFR-9)^{0.26} \times \exp\{-100 (d-0.88)\} + 0.1$;

(d) the relationship between Tm (° C.) and density (d) is as follows:

$$Tm < 400 \times d - 248,$$

preferably $Tm < 400 \times d - 249$;

(e) the copolymer contains the matter which is not extracted below 100° C. in the Temperature Rising Elution Fractionation Test (TREF) and the amount of the matter is not more than 10 wt %, preferably not more than 8 wt %;

(f) Mw/Mn is 2.8 to 15, preferably 3.0 to 10; and (g) the relationship between MT (g) and MFR at 190° C. is follows:

$$MT > 2.2 \times MFR^{-0.84},$$

preferably $MT > 4.0 \times MFR^{-0.84}$.

The second desirable embodiment is the ethylene/α-olefin copolymer (a) being a polymer (hereinafter referred to as "M-2") meeting the following conditions (a) through (g):

(a) d is 0.880 to 0.950 (g/cm³), preferably 0.890 to 0.935 (g/cm³);

(b) MFR is 0.01 to 20 (g/10 minutes), preferably 0.3 to 10 (g/10 minutes);

(c) the relationship between W (wt %) at 23° C. and density (d) is as follows:
when MFR ≦ 10 (g/10 minutes), $$W < 80 \times \exp\{-100(d-0.88)\} + 0.1,$$

preferably $W < 60 \times \exp\{-100(d-0.88)\} + 0.1$, more preferably $W < 40 \times \exp\{-100(d-0.88)\} + 0.1$, when MFR > 10 (g/10 minutes), $$W < 80 \times (MFR \times 9)0.26 \times \exp\{-100d - 0.88)\} + 0.1;$$

(d) the relationship between Tm (° C.) and density (d) is as follows:

$$Tm < 400 \times d - 244;$$

(e) the copolymer contains the matter which is not extracted below 100° C. in the Temperature Rising Elution Fractionation Test (TREF) and the amount of the matter is not more than 10 wt %, preferably not more than 8 wt %;

(f) Mw/Mn is 2.0 to 8.0, preferably 2.5 to 7.0; and (g) the relationship between MT (g) and MFR at 190° C. is follows:

$$MT \leq 2.2 \times MFR^{-0.84}.$$

Method for Manufacturing the Ethylene/α-olefin Copolymer (a)

The copolymer (a) having the physical properties can be manufactured satisfactorily by feeding an ethylene and an α-olefin having 3 to 20 carbon atoms to a polymerization system, using the olefin polymerization catalyst components (a) to (d) as described below.

(a) a compound of transition metal atom in the Group IV of the periodic table which has the ligand of cyclopentadienyl skeleton;

(b) an organoaluminum oxy-compound;

(c) a support; and (d) an organoaluminum compound as required.

First given below an explanation of the olefin polymerization catalyst.

<(a) Transition Metal Compound:>

This compound forming the center of the catalyst system is a compound of transition metal atom in the Group IV of the periodic table containing a ligand having the cyclopentadienyl skeleton and is represented by the following general formula:

(In the formula,

M represents a transition metal atom selected from the Group IV of the periodic table, specifically zirconium, titanium or hafnium, preferably zirconium;

$L_1$ represents the ligands attached to the transition metal atom, out of which at least two ligands $L_1$ are the cyclopentadienyl group or the substituted cyclopentadienyl group having not less than one substituent selected from among the hydrocarbon groups having 2 to 10 carbon atoms, with the other ligands being the hydrocarbon group having 1 to 12 carbon atoms, alkoxy group, aryloxy group, halogen atom, trialkylsilyl group or hydrogen atom, and each ligand and substituent may be the same or different from one another; and x represents the valence of the transition metal atom M.)

Examples of the transition metal compound represented by the above general formula include such compounds as:

Bis(cyclopentadienyl)zirconiumdichloride,
Bis(methylcyclopentadienyl)zirconiumdichloride,
Bis(ethylcyclopentadienyl)zirconiumdichloride,
Bis(n-propylcyclopentadienyl)zirconiumdichloride,
Bis(n-butylcyclopentadienyl)zirconiumdichloride,
Bis(n-hexylcyclopentadienyl)zirconiumdichloride,
Bis(methyl-n-propylcyclopentadienyl) zirconiumdichloride,
Bis(dimethyl-methyl-n-propylcyclopentadienyl) zirconiumdichloride,
Bis(methyl-n-butylcyclopentadienyl) zirconiumdibromide,
Bis(n-butylcyclopentadienyl)zirconiumdichloride,
Bis(n-butylcyclopentadienyl)zirconiummethoxychloride,
Bis(n-butylcyclopentadienyl)zirconiumethoxychloride,
Bis(n-butylcyclopentadienyl)zirconiumbutoxychloride,
Bis(n-butylcyclopentadienyl)zirconiumethoxide,
Bis(n-butylcyclopentadienyl)zirconiummethylchloride,
Bis(n-butylcyclopentadienyl)zirconiumdimethyl,
Bis(n-butylcyclopentadienyl)zirconiumbenzylchloride,
Bis(n-butylcyclopentadienyl)zirconiumdibenzyl,
Bis(n-butylcyclopentadienyl)zirconiumphenylchloride,
Bis(n-butylcyclopentadienyl)zirconiumhydridechloride,
Bis(dimethylcyclopentadienyl)zirconiumdichloride,
Bis(diethylcyclopentadienyl)zirconiumdichloride,
Bis(methylethylcyclopentadienyl)zirconiumdichloride,
Bis(dimethylethylcyclopentadienyl)zirconiumdichloride,
Bis(dimethylcyclopentadienyl)zirconiumdibromide,
Bis(dimethylcyclopentadienyl) zirconiummethoxychloride,
Bis(dimethylcyclopentadienyl)zirconiumethoxychloride, Bis(dimethylcyclopentadienyl)zirconiumbutoxychloride,
Bis(dimethylcyclopentadienyl)zirconiumdiethoxide,
Bis(dimethylcyclopentadienyl)zirconiummethylchloride,
Bis(dimethylcyclopentadienyl)zirconiumdimethyl,
Bis(dimethylcyclopentadienyl)zirconiumbenzylchloride,
Bis(dimethylcyclopentadienyl)zirconiumdibenzyl,
Bis(dimethylcyclopentadienyl)zirconiumphenylchloride, and
Bis(dimethylcyclopentadienyl)zirconiumhydridechloride.

Further, in the examples, the two substituents of the cyclopentadienyl ring contains 1,2- and 1,3-substituents, and the three substituents contain 1,2,3- and 1,2,4-substituents. Further, in the zirconium compounds, a transition metal compound replacing the zirconium metal with titanium metal or hafnium metal may be used.

Out of the transition metal compounds represented by the general formula, the following compounds are preferable:
Bis(n-propylcyclopentadienyl)zirconiumdichloride,
Bis(n-butylcyclopentadienyl)zirconiumdichloride,
Bis(1-methyl-3-n-propylcyclopentadienyl)zirconiumdichloride,
Bis(1-methyl-3-n-butylcyclopentadienyl)zirconiumdichloride,
Bis(1,3-dimethylcyclopentadienyl)zirconiumdichloride,
Bis(1,3-diethylcyclopentadienyl)zirconiumdichloride, and
Bis(1-methyl-3-ethylcyclopentadienyl)zirconiumdichloride.

The transition metal compound used may be a mixture of two or more of the transition metal compounds represented by the aforesaid general formula. Specifically, examples of such mixture include the following combinations:
A combination of bis(1,3-n-butylmethylcyclopentadienyl)zirconiumdichloride and bis(1,3-dimethylcyclopentadienyl)zirconiumdichloride;
A combination of bis(1,3-n-propylmethylcyclopentadienyl)zirconiumdichloride and bis(1,3-dimethylcyclopentadienyl)zirconiumdichloride; and
A combination of bis(n-butylcyclopentadienyl)zirconiumdichloride and bis(1,3-dimethylcyclopentadienyl)zirconiumdichloride.

Further the transition metal compound may be a mixture of a transition metal compound represented by the aforesaid general formula (I) and a transition metal compound represented by the following general formula (II):

$$MKL_{2(x-2)} \quad (II)$$

(In the formula,
M represents a transition metal atom selected from the same Group IV of the periodic table as described above;
K and $L_2$ represent the ligands attached to the transition metal atom, with the ligand K being a two-seat ligand bonded via the lower alkylene group of the same or different indenyl groups, substituting indenyl groups or their partially hydrogenated groups and the ligand $L_2$ being the hydrocarbon group having 1 to 12 carbon atoms, alkoxy group, aryloxy group, halogen atom, trialkylsilyl group or hydrogen atom; and
x represents the valence of the transition metal atom M.)

Specific examples of the transition metal compound represented by the general formula (II) include the following compounds:
Ethylenebis(indenyl)zirconiumdichloride;
Ethylenebis(4-methyl-1-indenyl)zirconiumdichloride; and
Ethylenebis(4,5,6,7-tetrahydro-1-indenyl)zirconiumdichloride.

It is desirable that a combination of at least one transition metal compound selected from among the transition metal compounds represented by the general formula (I) and at least one transition metal compound selected from among the transition metal compounds represented by the general formula (II) should be used for the transition metal compound. In the case of using such combination, the (I)/(II) mol ratio is in the range of preferably 99/1 to 50/50, more preferably 97/3 to 70/30, much more preferably 95/5 to 75/25.

<(b) Organoaluminum Oxy-compound:>

The organoaluminum oxy-compound may be the benzene-soluble organo-aluminum oxy-compound already known to the public or the benzene-insoluble organoaluminum oxy-compound disclosed in Japanese Laid-Open Patent Publication No. 276807/1990. The organoaluminum oxy-compound may be used singly or in combination of not less than two types.

Such organoaluminum oxy-compound may be prepared by the following method, for example:

(1) Method in which a n organoaluminum compound such as trialkylaluminum is added to a hydrocarbon medium suspension of a compound containing an adsorbed water or a salt containing a crystal water such as magnesium chloride hydrate, copper sulfate hydrate, aluminum sulfate hydrate, nickel sulfate hydrate, cerium chloride hydrate, etc. to allow them to react with each other so that an organoaluminum oxy-compound may be recovered as hydrocarbon solution;

(2) Method in which water, ice or steam is added directly to oraganoaluminum compound such as trialkylaluminum in solvent such as benzene, toluene, ethyl ether and tetrahydrofuran to allow them to react with each other, so that an organo-aluminum oxy-compound may be recovered as hydrocarbon solution; and (3) Method in which an organic tin oxide such as dimethyltinoxide or dibutyltinoxide is added to an organoaluminum compound such as trialkylaluminum in a solvent such as decane, benzene and toluene.

Specific examples of the organoaluminum compound used in preparing the aluminum oxy-compound include the following compounds:

(1) Trialkylaluminums such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum;

(2) Tricycloalkylaluminums such as tricyclohexylaluminum and tricyclooctylaluminum;

(3) Dialkylaluminumhalides such as dimethylaluminumchloride, diethylaluminumchloride, diethylaluminumbromide and diisobutylaluminumchloride;

(4) Dialkylaluminumhidrides such as diethylaluminumhidride and diisobutylaluminumhidride;

(5) Dialkylaluminumalkoxides such as dimethylaluminummethoxide and diethylaluminumethoxide; and (6) Dialkylaluminumaryloxides such as diethylaluminumphenoxide.

Out of these, especially the trialkylaluminum is preferablely used.

Furthermore, as this organoaluminum compound, isoprenylaluminum represented by the following general formula may be used:

ti (i-$C_4H_9$)$_x$Al$_y$($C_5H_{10}$)$_z$ (In the above formula, x, y and z are positive numbers, and z≧2x.)

Examples of the solvent used in preparing the aluminum oxy-compound include aromatic hydrocarbons such as benzene, toluene, xylene, cumene and cymene, aliphatic hydrocarbons such as pentane, hexane, heptane, octane, decane, dodecane, hexadecane and octadecane, alicyclic hydrocarbons such as cyclopentane, cyclohexane, cyclooctane and methylcyclopentane, petroleum fractions such as gasoline, kerosine and gas oil, and halides, especially chlorides and bromides, of the aforesaid aromatic hydrocarbons, aliphatic hydrocarbons and alicyclic hydrocarbons, In addition, ethers such as ethylether and tetrahydrofuran may be used. Out of these solvents, especially aromatic hydrocarbons are preferable.

Further, the aforesaid benzene-insoluble organoaluminum oxy-compounds contain not more than 10%, preferably not more than 5% of the aluminum component soluble in benzene at 60° C. as converted into Al atoms, and are insoluble, or do not dissolve readily, in benzene.

<(c) Support:>

The support to be used is an inorganic or organic compound, which is a solid in the state of granules or fine particles having the particle diameter of 10 to 300 μm, preferably 20 to 200 μm. Such inorganic support is preferably a porous oxide, and specific examples of the inorganic support include $SiO_2$, $Al_2O_3$, MgO, $ZrO_2$, $TiO_2$, $Sb_2O_3$, CaO, ZnO, BaO and $ThO_2$, or mixtures of these, such as $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. Out of these, oxides comprising $SiO_2$ or $Al_2O_3$ as the principal component are preferable.

Such support differs in properties, depending on the kind and manufacturing process thereof. However, the support preferably to be used has preferably a specific surface of 50 to 1,000 m$^2$/g, preferably 100 to 700 m$^2$/g, and a pore volume of 0.3 to 2.5 cm$^3$/g. The support may be sintered as required at 100 to 1,000° C., preferably 150 to 700° C. before use.

As an example of other supports that can be used, a granular or fine-particle solid of an organic compound having a particle diameter of 10 to 300 μm may be cited. Examples of such organic compound include polymers comprising α-olefins having 2 to 14 carbon atoms, such as ethylene, propylene, 1-butene and 4-methyl-1-pentene as the principal component, or polymers comprising vinylcyclohexane and styrene as the principal component.

<(d) Organoaluminum Compound:>

For the organoaluminum compound that is to be added as required, the compound represented by the following general formula (III) may be cited as an example:

$$R_{1(n)}AlX_{(3-n)} \quad (III)$$

(In the above formula, $R_1$ represents the hydrocarbon group having 1 to 12 carbon atoms, X represents halogen atom or hydrogen atom, and n is 1 to 3.)

Examples of $R_1$ include the alkyl group, cycloalkyl group or aryl group, specifically methyl group, ethyl group, n-propyl group, isopropyl group, isobutyl group, pentyl group, hexyl group, octyl group, cyclopentyl group, cyclohexyl group, phenyl group and tolyl group.

As specific examples of such organoaluminum compound, the following compounds may be cited:

(1) Trialkylaluminums such as trimethylaluminum, triethylaluminum, triisopropylaluminum, triisobutylaluminum, trioctylaluminum and tri-2-ethylhexylaluminum;

(2) Alkenylaluminums such as isoprenylaluminum;

(3) Dialkylaluminumhalides such as dimethylaluminumchloride, diethylaluminumchloride, diisopropylaluminumchloride, diisobutylaluminumchloride and dimethylaluminumbromide;

(4) Alkylaluminumsesquihalides such as methylaluminumsesquichloride, ethylaluminumsesquichloride, isopropylaluminumsesquichloride, butylaluminumsesquichloride and ethylaluminumsesquibromide;

(5) Alkylaluminumdihalides such as methylaluminumdichloride, ethylaluminumdichloride, isopropylaluminumdichloride and ethylaluminumdibromide; and (6) Alkylaluminumhidrides such as diethylaluminumhidride and diisobutylaluminumhidride.

Furthermore, as this organoaluminum compound, the compound represented by the following general formula (IV) may be used:

$$R_{1(n)}AlY_{(3-n)} \quad (IV)$$

(In the above formula, $R_1$ represents the same hydrocarbon group as $R_1$ of the aforesaid general formula (III);

Y represents the —$OR_2$ group, —$OSi(R_3)_3$, —$OAl(R_4)_2$ group, —$N(R_5)_2$ group, —$Si(R_1)_3$ group or —$N(R_7)Al(R_8)_2$ group; n is 1 to 2; $R_2$, $R_3$, $R_4$ and $R_8$ represent the methyl group, ethyl group, isopropyl group, isobutyl group, cyclohexyl group, phenyl group, etc.; $R_5$ represents hydrogen atom, methyl group, ethyl group, isopropyl group, phenyl group, trimethylsilyl group, etc.; and $R_6$ and $R_7$ represent the methyl group, ethyl group, etc.)

As such organoaluminum compound, the following compounds are specifically used:

(1) Compounds represented by $R_{1(n)}Al(OR_2)_{(3-n)}$, such as dimethylaluminummethoxide, diethylaluminumethoxide and diisobutylaluminummethoxide;

(2) Compounds represented by $R_{1(n)}Al(OSi(R_3)_3)_{(3-n)}$, such as $Et_2Al(OSiMe_3)$, (iso-$Bu)_2Al(OSiMe_3)$ and (iso-$Bu)_2Al(OSiEt_3)$;

(3) Compounds represented by $R_{1(n)}Al(OAl(R_4)_2)_{(3-n)}$, such as $Et_2AlOAlEt_2$ and (iso-u)$_2AlOAl$(iso-Bu)$_2$;

(4) Compounds represented by $R_{1(n)}Al(N(R_5)_2)_{(3-n)}$, such as $Me_2AlNEt_2$, $Et_2Al$ NHMe, $Me_2AlNHEt$, $Et_2AlN(SiMe_3)_2$ and (iso-$Bu)_2AlN(SiMe_3)_2$;

(5) Compounds represented by $R_{1(n)}Al(Si(R_6)_3)_{(3-n)}$, such as (iso-$Bu)_2AlSiMe_3$; and (6) Compounds represented by $R_{1(n)}Al(N(R_7)Al(R_8)_2)_{(3-n)}$, such as $Et_2AlN(Me)AlEt_2$ and (iso-$Bu)_2AlN(Et)Al$(iso-Bu)$_2$.

Out of the organoaluminum compounds represented by the aforesaid general formulas (III) and (IV), the compounds represented by the general formulas $(R_1)_3Al$, $R_{1(n)}Al(OR_2)_{(3-n)}$, and $R_{1(n)}Al(OAl(R_4)_2)_{(3-n)}$. Especially those compounds having the general formula in which $R_1$ is the isoalkyl group and n is 2 are preferable.

<Catalyst Preparation Method:>

The olefin polymerization catalyst is prepared by bringing component (a), component (b), support (c) and as required component (d) into contact. The sequence of bringing them into contact is selected optionally. However, preferably support (c) and component (b) are mixed and brought into contact, then component (a) is mixed and brought into contact with them, and as required component (d) is mixed and brought into contact.

These components may be brought into contact in an inactive hydrocarbon solvent. Specific examples of such inactive hydrocarbon medium that is to be used in the preparation of the catalyst include aliphatic hydrocarbons such as propane, butane, pentane, hexane, heptane, octane, decane, dodecane and kerosine; alicyclic hydrocarbons such as cyclopentane, cyclohexane and methylcyclopentane; aromatic hydrocarbons such as benzene, toluene and xylene; halogenated hydrocarbons such as ethylenechloride, chlorobenzene and dichloromethane; and mixtures thereof.

In mixing and bringing into contact component (a), component (b), support (c) and as required component (d), component (a) is used in an amount of normally $5\times10^{-6}$ to $5\times10^{-4}$ mol, preferably $10^{-5}$ to $2\times10^{-4}$ mol per g of support (c), and the concentration of component (a) is in a range of approximately $10^{-4}$ to $2\times10^{-2}$ (mol/liter), preferably $2\times10^{-4}$ to $10^{-2}$ (mol/liter). The atomic ratio (Al/transition metal atom) between aluminum of component (b) and transition metal atom of component (a) is normally 10 to 500, preferably 20 to 200. The atomic ratio (Al-d/Al-b) between aluminum atoms (Al-d) of component (d), which is used as required, and aluminum atoms (Al-b) of component (b) is in a range of normally 0.02 to 3, preferably 0.05 to 1.5. The mixing temperature at the time of mixing and bringing into contact component (a), component (b), support (c) and as required component (d) is normally −50 to 150° C., preferably −20 to 120° C., and the contacting time is normally 1 minute to 50 hours, preferably 10 minutes to 25 hours.

The olefin polymerization catalyst thus obtained is supported in such manner that the transition metal atoms deriving from component (a) are supported in an amount of $5\times10^{-6}$ to $5\times10^{-4}$, preferably $10^{-5}$ to $2\times10^{-4}$ gram atoms per g of support desirable that the aluminum atoms deriving from component (b) and component (d) should be supported in an amount of $10^{-3}$ to $5\times10^{-2}$, preferably $2\times10^{-3}$ to $2\times10^{-2}$ gram atoms per g of support (c).

The olefin polymerization catalyst may be a prepolymerized catalyst obtained by prepolymerizing an olefin in the presence of component (a), component (b), support (c) and as required component (d). The prepolymerization may be carried out by introducing the olefin into an inactive hydrocarbon solvent in the presence of component (a), component (b), support (c) and as required component (d).

Examples of the olefin that is to be used in the prepolymerization include α-olefins having 2 to 20 carbon atoms, such as ethylene, propylene, 1-butene, 1-pentene, 4-methyl-1-pentene, 1-hexene, 1-octene, 1-decene, 1-dodecene and 1-tetradecene. Out of these, ethylene or a combination of ethylene and α-olefin, that is to be used in the polymerization, is preferable.

At the time of the prepolymerization, component (a) is used in a concentration of normally $10^{-6}$ to $2\times10^{-2}$ (mol/liter), preferably $5\times10^{-5}$ to $10^{-2}$ (mol/liter), amount of component (a) is used of normally $5\times10^{-6}$ to $5\times10^{-4}$ mol, preferably $10^{-5}$ to $2\times10^{-4}$ mol per g of support (c). The atomic ratio (Al/transition metal) between aluminum of component (b) and transition metal of component (a) is normally 10 to 500, preferably 20 to 200. The atomic ratio (Al-d/Al-b) between aluminum atoms (Al-d) of component (d), which is used as required, and aluminum atoms (Al-b) of component (b) is in a range of normally 0.02 to 3, preferably 0.05 to 1.5. The prepolymerization temperature is −20 to 80° C., preferably 0 to 60° C., and the prepolymerization time is 0.5 to 100 hours, preferably 1 to 50 hours.

The prepolymerized catalyst is prepared by the method as described below, for example. Specifically, support (c) is brought into a suspended state in an inactive hydrocarbon. Next, an organoaluminum oxy-compound (component (b)) is added to this suspension and allowed to react for a particular time. After that, the supernatant liquid is removed, and the solid matter thus obtained is brought into a suspended state again in an inactive hydrocarbon. A transition metal compound (component (a)) is added to this system and allowed to react for a particular time. After that, the supernatant liquid is removed, and the solid catalyst component is obtained. Subsequently, the solid catalyst component obtained as described above is added to the inactive hydrocarbon containing the organoaluminum compound (component (d)), and the olefin is introduced into the liquid so that the prepolymerized catalyst is obtained.

It is desirable that the amount of the olefin copolymer formed by the prepolymerization is 0.1 to 500 g, preferably 0.2 to 300 g, more preferably 0.5 to 200 g per g of support (c). Further, in the polymerized, component (a) is supported in an amount of approximately $5\times10^{-6}$ to $5\times10^{-4}$, preferably $10^{-5}$ to $2\times10^{-4}$ gram atoms in terms of transition metal atoms per g of support (c). It is desirable that the aluminum atoms (Al) deriving from component (b) and component (d) should be supported in a molar ratio (Al/M) to the transition metal atoms (M) deriving from component (a) which ranges from 5 to 200, preferably 10 to 150.

The prepolymerization may be carried out by either batch or continuous process and under either vacuum, normal pressure or raised pressure. It is desirable that in the prepolymerization, a prepolymer is so produced in the presence of hydrogen that at least the intrinsic viscosity [η] as measured in decaline at 135° C. is in a range of 0.2 to 7, preferably 0.5 to 5 (dl/g).

<Polymerization Method:>

The ethylene/α-olefin copolymer (a) used in the invention can be obtained by copolymerizing an ethylene and an α-olefin having 3 to 20 carbon atoms in the presence of the olefin polymerization catalyst or prepolymerized catalyst.

The copolymerization of the ethylene and the α-olefin is conducted in the gas phase or in the slurry-like liquid phase. In slurry polymerization, an inactive hydrocarbon may be used as the solvent, or the olefin itself may be used as the solvent.

Specific examples of the inactive hydrocarbon solvent to be used in such slurry polymerization include aliphatic hydrocarbons such as butane, isobutane, pentane, hexane, octane, decane, dodecane, hexadecane and octadecane; alicyclic hydrocarbons such as cyclopentane, methylcyclopentane, cyclohexane and cyclooctane; aromatic hydrocarbons such as benzene, toluene and xylene; and petroleum fractions such as gasoline, kerosine and gas oil. Out of these inactive hydrocarbon media, the aliphatic hydrocarbons, alicyclic hydrocarbons and petroleum fractions are especially preferable.

In conducting the copolymerization by the slurry polymerization process or the gas phase polymerization process, it is desirable that the aforesaid olefin polymerization catalyst or prepolymerized catalyst should be used in a concentration of normally $10^{-8}$ to $10^{-3}$, preferably $10^{-7}$ to $10^{-4}$ (gram atom/liter) in terms of the concentration of the transition metal atoms in the polymerization reaction system.

Furthermore, in the polymerization, an organoaluminum oxy-compound like component (b) and/or the organoaluminum compound (d) may be added. In this case, the atomic ratio (Al/M) between the aluminum atoms (Al) deriving from the organoaluminum oxy-compound and the organoaluminum compound and the transition metal atoms (M) deriving from the transition metal compound (a) is a range of 5 to 300, preferably 10 to 200, more preferably 15 to 150.

In using the slurry polymerization process, the polymerization temperature is in a range of −50 to 100° C., preferably 0 to 90° C.; and in using the gas phase polymerization process, the polymerization temperature is in a range of normally 0 to 120° C., preferably 20 to 100° C.

The polymerization pressure is either normal pressure to a raised level of 100 kg/cm$^2$, preferably 2 to 50 kg/cm$^2$. The polymerization may be accomplished by either batch, semi-continuous or continuous process. The polymerization may also be carried out in two or more stages.

Furthermore, the polymerization may be conducted by carrying out copolymerization in two or more stages in which reaction conditions are different by using one or not less than two reactors.

Insulating Material

The insulating material forming of the coating layer is a resin comprising the ethylene/α-olefin copolymer (a) as described above. It may be composed of the ethylene/α-olefin copolymer (a) alone or a resin composition thereof to which another ethylene-based polymer has been compounded.

Even the single use of the ethylene/α-olefin copolymer (a) makes it possible to obtain a coating layer showing satisfactory mechanical properties, wear resistance, heat stability, appearance and extrudability as described above. In the case of using the ethylene/α-olefin copolymer (a) in the state of a resin composition as the insulating material, such another ethylene-based polymer to be compounded may be an ethylene homopolymer or a copolymer of an ethylene and an α-olefin.

The first desirable embodiment of such resin composition is a composition of the ethylene/α-olefin copolymer (a) with a high-pressure low-density polyethylene. In that case, the composition comprising 60 to 97 wt %, preferably 65 to 95 wt %, more preferably 70 to 90 wt % of the ethylene/α-olefin copolymer (a) and 3 to 40 wt %, preferably 5 to 35 wt %, more preferably 10 to 30 wt % of the high-pressure low-density polyethylene is preferable.

If the ethylene/α-olefin copolymer (a) is M-1 mentioned above, the preferable composition is such that the M-1 content is 60 to 97 wt %, preferably 65 to 90 wt %, and the high-pressure low-density polyethylene content is 3 to 40 wt %, preferably 10 to 35 wt %. If the ethylene/α-olefin copolymer (a) is M-2 mentioned above, the preferable composition is such that the M-2 content is 70 to 97 wt %, preferably 80 to 95 wt %, and the high-pressure low-density polyethylene content is 3 to 30 wt %, preferably 5 to 20 wt %.

The high-pressure low-density polyethylene that may be used preferably has the density of 0.917 to 0.928 (g/cm$^3$) and the MFR of 0.1 to 5 (g/10 minutes). If the high-pressure low-density polyethylene is compounded in such manner, the flowability and moldability of the coating resin are improved further, making molding without melt sagging at a high extrusion rate possible.

The second desirable embodiment of the resin composition is a composition which uses another ethylene/α-olefin copolymer (b) which is manufactured by use of the metallocene catalyst similarly as in the case of the ethylene/α-olefin copolymer (a) but has different physical properties from those of the ethylene/α-olefin copolymer (a). In this case, it is desirable that the ethylene/α-olefin copolymer (a) should be M-2 mentioned above. Specifically, such composition comprises:

(1) the ethylene/α-olefin copolymer (a): 10 to 90 wt %
(2) the ethylene/α-olefin copolymer (b): 10 to 90 wt %

The ethylene/α-olefin copolymer (b) meets the following conditions (i) through (v):

(i) a density (d) is 0.880 to 0.940 (g/cm$^3$);
(ii) a MFR is 3 to 60 (g/10 minutes);
(iii) a relationship between melt tension (MT (g)) and MFR (g/10 minutes) at 190° C. is as follows:

$$MT > 2.2 \times MFR^{-0.84},$$

(iv) a relationship between a decane soluble matter content at 23° C. (W (wt %)) and the density (d) is as follows:
when MFR $\leq$ 10 (g/10 minutes), $$W < 80 \times \exp\{-100(d-0.88)\} + 0.1,$$

when MFR > 10 (g/10 minutes), $$W < 80 \times (MFR \times 9)^{0.26} \times \exp\{-100(d-0.88)\} + 0.1;$$

(v) a relationship between a temperature (Tm (° C.)) at the position of the highest peak of the endothermic curve as measured by use of a differential scanning calorimeter (DSC) and the density (d) is:

$$Tm < 400 \times d - 248.$$

Use of these compositions results in an improvement in melt tension, making it possible to form a coating layer with satisfactory moldability.

Furthermore, a crosslinking agent may be compounded additionally to this insulating material. As such crosslinking agent, peroxides or silane compounds can be used satisfactorily. Use of the crosslinking agent enables the insulating material comprising the ethylene/α-olefin copolymer (a) to be crosslinked at a high crosslinking rate and to an appropriate degree of crosslink density. Because of this, the insulating material thus obtained provides the coating layer showing excellent mechanical strength and wear resistance and shows improved heat resistance and heat cycle characteristics.

Examples of usable peroxides include dicumyl peroxide, t-butylcumyl peroxide, 1,3-bis-(t-butylperoxyisopropyl) benzene, 2,5-dimethyl-2,5-di-(t-butylperoxy)hexine-3,2,5-dimethyl-2,5-di-(t-butylperoxy)hexane, 1-(2-t-butylperoxyisopropyl)-4-isopropylbenzene, and 1-(2-t-butylperoxyisopropyl)-3-isopropylbenzene. Such peroxide is compounded in an amount of 0.03 to 5 parts by weight, preferably 0.05 to 3 parts by weight, against 100 parts by weight of the insulating material.

Further, as such silane compounds, the use of silane compounds having polymerizable double bond, such as the vinyl group, including vinyltrimethoxysilane or vinyltriethoxysilane, is suitable, and such silane compound may be used together with the aforesaid peroxides. The compounding amount of such silane compound is 0.3 to 5 parts by weight, preferably 0.5 to 3 parts by weight against 100 parts by weight of the insulating material.

When such silane compound is used, a peroxide is compounded at the same time to proceed the grafting reaction to the ethylene/α-olefin copolymer (a) or the resin composition thereof to which another ethylene-based polymer has been compounded. As the peroxide that can be used for this purpose, the same peroxides as mentioned above may be used. Furthermore, at this time, a crosslinking catalyst may be used additionally. As examples of such crosslinking catalyst, di-n-butyltindilaurate and di-n-octyltindilaurate can be cited.

Further, additives such as antioxidants, weathering stabilizers, light stabilizers, heat stabilizers, antistatic agents, lubricants, pigments, dyes, nucleators, hydrochloric acid absorbers and plasticizers may be compounded to the insulating material as required to such extent that the purpose of the invention is not frustrated.

Coating Layer

The coating layer formed on the conductor or the conductor shielding layer may be a non-crosslinked or crosslinked insulating material, which is selected according to the use of wire. Normally a crosslinked insulating material is preferable.

When the insulating material to which a crosslinking agent has been compounded is extrusion-coated onto the conductor and then subjected to crosslinking treatment, the coating layer turns into an insulating material of a crosslinked structure, which shows improved heat resistance and heat cycle properties. If the peroxide is compounded as the crosslinking agent, crosslinking reaction is caused by heating; and if the silane compound is compounded as the crosslinking agent, crosslinking reaction is caused by reaction with water. Furthermore, this insulating material may be crosslinked by the irradiation of ionizing radioactive rays such as electron beams. The crosslinking method, type and compounding amount of the crosslinking agent, crosslinking conditions and other details are selected so that the degree of crosslinking will be ultimately not less than 25%, preferably not less than 40%.

Any coated insulating material having the following properties is preferable for use in a wire coating layer:

(1) tensile strength is not less than 15 MPa;

(2) tensile elongation is not less than 400%; and (3) the amount of wear as measured by the taper wear test is not more than 15 mg.

Wire Manufacturing Process

A wire manufacturing process of the invention is that an insulating material comprising the ethylene/α-olefin copolymer(a) having the aforesaid physical properties is extrusion-coated directly onto a conductor or a conductor shielding layer. First, the insulating material is fed to the extruder, where it is melted and sent to the front part of the extruder. On the other hand, the conductor is fed to the crosshead die installed at the front end of the extruder, and the melted insulating material is extruded around the conductor, which is continuously coated. At this time, the insulating material layer may constitute the outermost layer, or the outside of the insulating material layer may be further coated with another resin or material.

It is desirable that the extrusion coating should be conducted under such conditions that the resin pressure of the melted insulating material is within the range as shown below. Specifically, the resin pressure P is controlled within the range of molding conditions as represented by the following formula, wherein P (kg/cm$^2$) stands for the resin pressure; T (° C.) stands for the resin temperature; K (kg/hour) stands for the extrusion rate; A (cm$^2$) stands for the lip cross-sectional area of the extruder; and MFR (g/10 minutes) stands for the melt flow rate of the resin:

$$100 \times \{K/(MFR)^{1.5}/(T-120)/A\}^{0.2} \leq P \leq 1{,}000 \times \{K/(MFR)^{1.5}/(T-120)/A\}^{0.2},$$

preferably, $$130 \times \{K/(MFR)^{1.5}/(T-120)/A\}^{0.2} \leq P \leq 800 \times \{K/(MFR)^{1.5}/(T-120)/A\}^{0.2},$$

more preferably, $$200 \times \{K/(MFR)^{1.5}/(T-120)/A\}^{0.2} \leq P \leq 500 \times \{K/(MFR)^{1.5}/(T-120)/A\}^{0.2},$$

If the extrusion is conducted with the resin pressure being within the aforesaid range, it is possible to form the coating layer having satisfactory appearance with high speed extruding.

In the case in which the insulating material to which the crosslinking agent has been compounded is used, a step of crosslinking the insulating material is provided after the extrusion coating step.

First if the peroxide is used as the crosslinking agent, the insulating material is crosslinked when the temperature is raised above the decomposition temperature of the peroxide. An example of the process therefor is that a compound is first prepared in advance by mixing the peroxide with the ethylene/α-olefin copolymer (a) or the composition of the ethylene/α-olefin copolymer (a) and another ethylene-based polymer, and then the conductor is coated with such compound and heated to the temperature above the decomposition temperature of the peroxide so that a wire covered with the crosslinked insulating material is obtained.

Further, if the silane compound is used as the crosslinking agent, the insulating material is crosslinked by the action of water by either immersing the coated material in hot water or allowing it to stand in a humid atmosphere. In that case, the ethylene/α-olefin copolymer (a) or the composition of the ethylene/α-olefin copolymer (a) and another ethylene-based polymer is introduced into a hopper of an extruder, while a mixture of the silane compound, peroxide and crosslinking catalyst are continuously fed between hopper and extruder or into a barrel of the extruder. As a result, the insulating material with a grafted silane compound is formed in the extruder, and at the same time the conductor is coated. Subsequently, the coated wire is immersed in hot water or allowed to stand in the atmosphere so that the wire coated with the crosslinked insulating material is obtained.

There is also another method in which the ethylene/α-olefin copolymer (a) or the composition of the ethylene/α-olefin copolymer (a) and another ethylene-based polymer is grafted in advance by compounding the silane compound and as required a peroxide to it, a masterbatch of a crosslinking catalyst are added to it, and it is introduced into the extruder so that the conductor is coated with it. After that, the insulating material is crosslinked by immersing the coated wire in hot water or allowing it to stand in the atmosphere, so that the coated wire is obtained.

EXAMPLES

The invention will be understood more clearly through the following examples. However the invention is not limited to the examples.

First, the ethylene/α-olefin copolymer used was manufactured by the following method:

Reference Example 1

Manufacture of Ethylene/1-hexene Copolymer

<Preparation of Catalyst:>

10 kg of silica previously dried at 250° C. for 10 hours were brought into a suspended state, using 154 liters of toluene and then cooled to 0° C. After that, 57.5 liters of toluene solution of methylaluminooxane (Al=1.33 mol/liter) were dropped in one hour. At that time, the temperature in the system was kept at 0° C. After that, the liquid was allowed to continue to react at 0° C. for 30 minutes, heated to 95° C. over 1.5 hours, and allowed to react at that temperature for 20 hours. After that, the liquid was cooled to 60° C., and the supernatant liquid was removed by the decantation method.

The solid matter thus obtained was washed twice with toluene and then brought into a suspended state again with 100 liters of toluene. 16.8 liters of toluene solution of bis(1,3-dimethylcyclopentadienyl)zirconiumdichlorid (Zr=27.0 milmol/liter) were dropped to the system at 80° C. over 30 minutes and then allowed to react at 80° C. for 2 hours. After that, the supernatant liquid was removed and washed twice with hexane. As a result, a solid catalyst containing 3.5 mg of zirconium per g was obtained.

<Preparation of Pre-polymerized Catalyst:>

870 g of the solid catalyst obtained as described above and 260 g of 1-hexene were added to 87 liters of hexane containing 2.5 mol of triisobutylaluminum, and pre-polymerization of ethylene was carried out at 35° C. for 5 hours. As a result, a pre-polymerized catalyst having 10 g of the pre-polymerized polyethylene thereon per g of solid catalyst was obtained.

<Polymerization:>

Using continuous fluidized-bed gas-phase polymerization apparatus, ethylene and 1-hexene was copolymerized at a total pressure of 20 kg/cm$^2$-G and a polymerization temperature of 80° C. The pre-polymerized catalyst previously prepared was continuously fed at a rate of 0.33 (milmol/h) in terms of zirconium atom, and triisobutylaluminum was fed at a rate of 10 (milmol/h). In order to maintain a constant gas phase composition during polymerization, ethylene, 1-hexene, hydrogen and nitrogen were continuously fed (gas phase composition: 1-hexene/ethylene 0.02; hydrogen/ethylene=10.5×10$^{-4}$; ethylene concentration=70%).

The ethylene/1-hexene copolymer thus obtained was used in Example 1, and its properties were shown in Table 1. The copolymer used in Examples 2 to 5 was manufactured by varying the polymerization conditions, and its properties were also shown in Table 1.

Reference Example 2

Manufacture of Ethylene/1-hexene Copolymer

<Preparation of Catalyst:>

6.3 kg of silica previously dried at 250° C. for 10 hours were brought into a suspended state, using 100 liters of toluene and then cooled to 0° C. After that, 41 liters of toluene solution of methylaluminooxane (Al=0.96 mol/liter) were dropped in one hour. At that time, the temperature in the system was kept at 0° C. After that, the liquid was allowed to continue to react at 0° C. for 30 minutes, heated to 95° C. over 1.5 hours, and allowed to react at that temperature for 4 hours. After that, the liquid was cooled to 60° C., and the supernatant liquid was removed by the decantation method.

The solid matter thus obtained was washed twice with toluene and then brought into a suspended state again with 125 liters of toluene. 15 liters of toluene solution of bis(n-butylcyclopentadienyl)zirconiumdichlorid (Zr=42.7 milmol/liter) were dropped to the system at 30° C. over 30 minutes and then allowed to react at 30° C. for 2 hours. After that, the supernatant liquid was removed and washed twice with hexane. As a result, a solid catalyst containing 6.2 mg of zirconium per g was obtained.

<Preparation of Pre-polymerized Catalyst:>

8.5 kg of the solid catalyst obtained as described above were added to 300 liters of hexane containing 14 mol of triisobutylaluminum, and pre-polymerization of ethylene was carried out at 35° C. for 7 hours. As a result, a pre-polymerized catalyst having 3 g of the pre-polymerized polyethylene thereon per g of solid catalyst was obtained.

<Polymerization:>

Using continuous fluidized-bed gas-phase polymerization apparatus, ethylene and 1-hexene was copolymerized at a total pressure of 18 kg/cm$^2$-G and a polymerization temperature of 80° C. The pre-polymerized catalyst previously prepared was continuously fed at a rate of 0.15 (milmol/h) in terms of zirconium atom, and triisobutylaluminum was fed at a rate of 10 (milmol/h). In order to maintain a constant gas phase composition during polymerization, ethylene, 1-hexene, hydrogen and nitrogen were continuously fed (gas phase composition: 1-hexene/ethylene=0.020; hydrogen/ethylene=6.6×10$^{-4}$; ethylene concentration=10%).

The ethylene/1-hexene copolymer thus obtained was used in Example 6, and its properties were shown in Table 2. Further, the B value which shows the distribution arrangement of 1-hexene unit in this copolymer was 1.02.

In Examples 7 and 8, and Comparative Example 1, the ethylene/1-hexene copolymer was manufactured similarly by varying the polymerization conditions, and its properties were shown in Table 2.

Reference Example 3

Manufacture of Ethylene/1-hexene Copolymer

Using the titanium-based catalyst (Ziegler catalyst) as described in Published Japanese Patent Publication No. 54289/1988 and triethylaluminum, the ethylene/1-hexene copolymer was manufactured in the manner similar to Reference Example 2. The ethylene content was 3.0 mol %, and other properties were shown in Table 2.

Next, using the ethylene/1-hexene copolymer manufactured as described in Reference Examples 1 to 3, the extrusion-coating of the conductor was carried out.

Here, the determination of the physical properties of the coated layer was made by the following method:

(1) Strength at break and elongation at break:
   Determination of strength at break and elongation at break was made in accordance with JIS C3005.

(2) Taper wear:
   Taper wear was determined at the conditions of 60 rpm and 1,000 rotations in accordance with JIS K7204, using a load of 1 kg and a wear wheel CS-17.

(3) Gel content:
   Determination of the gel content was made in accordance with JIS C3005.

(4) Melting point:
   An endothermic curve was measured by DSC, and the temperature at the position where the peak appeared was taken as the melting point.

Example 1

A coating layer of 2.5 mm thickness was formed by feeding the ethylene/1-hexene copolymer obtained as described in Reference Example 1 into a 100-mmφ single screw extruder, while feeding the 16-mmφ conductor through the crosshead die, and continuously performing coating operations for the conductor under the molding conditions as described in Table 1.

The physical properties of the wire coating layer thus obtained were measured, and the results were shown in Table 1.

Example 2

A coated wire was obtained by performing the same operations as described in Example 1 except that the ethylene/1-hexene copolymer manufactured by varying the polymerization conditions of Reference Example 1 was used. The physical properties of the coated wire were measured, and the results were shown in Table 1.

Examples 3 to 5

The ethylene/1-hexene copolymer was manufactured by employing the polymerization conditions different from those of Reference Example 1, and the properties thereof were shown in Table 1. A coated wire was obtained by performing the same operations as described in Example 1 under the molding conditions as described in Table 1 except that 1.1 part by weight of a mixture (as a crosslinking agent) of vinyltrimethoxysilane, dicumylperoxide and dibutyltin-dilaurate (blending ratio=100:10:4.1 (by weight)) was compounded to 100 parts by weight of the ethylene/1-hexene copolymer.

The physical properties of the coating layer of the wire thus obtained were measured, and the results were shown in Table 1.

Here, in Table 1, formula (1) represents $2.2 \times MFR^{-0.84}$, formula (2) represents $80 \times \exp\{-100(d-0.88)\}+0.1$, formula (3) represents $400 \times d - 248$, formula (4) represents $100 \times \{K/(MFR)^{1.5}/(T-120)/A\}^{0.2}$, and formula (5) represents $1000 \times \{K/(MFR)^{1.5}/(T-120)/A\}^{0.2}$.

TABLE 1

|  | Ex. 1 | Ex. 2 | Ex. 3 | Ex. 4 | Ex. 5 |
|---|---|---|---|---|---|
| Physical properties of ethylene/1-hexene copolymer: | | | | | |
| Density (g/cm$^3$) | 0.914 | 0.914 | 0.914 | 0.923 | 0.914 |
| MFR (g/10 min) | 3.0 | 1.5 | 3.0 | 4.8 | 1.5 |
| Melt tension (g) | 3.0 | 5.0 | 3.0 | 2.1 | 5.0 |
| Value of Formula (1) | 0.87 | 1.56 | 0.87 | 0.59 | 1.56 |
| Decane soluble matter content (%) | 1.8 | 1.9 | 1.8 | 1.0 | 1.9 |
| Value of Formula (2) | 2.77 | 2.77 | 2.77 | 1.19 | 2.77 |
| Melting point (° C.) | 116, 95 | 116, 95 | 116, 95 | 120 | 116, 96 |
| Value of Formula (3) | 117.6 | 117.6 | 117.6 | 121.2 | 117.6 |
| Mw/Mn | 3.3 | 3.5 | 3.3 | 3.5 | 3.5 |
| TREF insoluble matter content (%) (100° C.) | 2.2 | 2.9 | 2.2 | 4.8 | 2.9 |
| Compounding amount of crosslinking agent (parts by weight) | 0 | 0 | 1.1 | 1.1 | 1.1 |
| Extrusion conditions: | | | | | |
| Resin temperature (° C.) | 198 | 200 | 236 | 233 | 238 |
| Extrusion rate (kg/h) | 12 | 12 | 15 | 15 | 15 |
| Lip cross-sectional area (cm$^2$) | 1.1 | 1.1 | 1.1 | 1.1 | 1.1 |
| Resin pressure (kg/cm$^2$) | 101 | 120 | 181 | 176 | 185 |
| Value of Formula (4) | 48.5 | 59.4 | 46.9 | 40.9 | 57.5 |
| Value of Formula (5) | 485 | 594 | 469 | 409 | 575 |
| Physical properties of coated layer: | | | | | |
| Gel content (%) | 0 | 0 | 70 | 68 | 71 |
| Strength at break (MPa) | 23.2 | 21.8 | 25.6 | 24.1 | 26.8 |
| Elongation at break (%) | 550 | 550 | 500 | 520 | 540 |
| Taper wear (mg) | 9.8 | 8.8 | 8.9 | 8.0 | 7.7 |
| Appearance | Good | Good | Good | Good | Good |

Formula (1) represents $2.2 \times MFR^{-0.84}$; Formula (2) represents $80 \times \exp\{-100(d-0.88)\}+0.1$; Formula (3) represents $400 \times d - 248$; Formula (4) represents $100 \times \{K/(MFR)^{1.5}/(T-120)/A\}^{0.2}$; Formula (5) represents $1,000 \times \{K/(MFR)^{1.5}/(T-120)/A\}^{0.2}$.

Example 6

A coating layer of 2.5 mm thick was formed by feeding the ethylene/1-hexene copolymer obtained as described in Reference Example 2 into a 100-mmφ single-screw extruder, while feeding a 16-mmφ conductor through the crosshead die, and performing operations for continuously coating the conductor under the molding conditions: extrusion rate: 150 kg/h; and resin temperature: 235° C.

The physical properties of the coating layer of the coated power cable thus obtained were measured, and the results were shown in Table 2.

Examples 7 and 8

The ethylene/1-hexene copolymer was manufactured by employing the polymerization conditions different from those of Reference Example 2, and the properties thereof were shown in Table 2. Next, 1.1 part by weight of a silane compound was compounded to 100 parts by weight of the aforesaid ethylene/1-hexene copolymer, and a wire was coated with the compound under the same molding conditions as described in Example 6 and then immersed in hot water at 80° C. for 24 hours. Here, the crosslinking agent used here was a mixture of vinylmethoxysilane, dicumylperoxide and dibutyltinlaurate (compounding ratio: 100:10:4.1 (by weight)).

The physical properties of the coating layer of the power cable thus obtained were measured, and the results were shown in Table 2.

Examples 9 and 10

The same operations as described in Example 7 were performed except that 15 parts by weight of high-pressure low-density polyethylene (density: 0.920 g/cm$^{13}$; MFR: 0.15 g/10 minutes) were added to 85 parts by weight each of the ethylene/1-hexene copolymer used in Examples 7 and 8. The physical properties of the composition before crosslinking and the physical properties of the coating layer of the power cable were measured, and the results were shown in Table 2.

Comparative Example 1

The same operations as described in Example 6 were repeated except that the ethylene/α-olefin copolymer having the physical properties as shown in Table 2 was used. The physical properties of the coating layer of the power cable thus obtained were measured, and the results were shown in Table 2.

Comparative Example 2

The same operations as described in Example 6 were performed except that the ethylene/1-hexene copolymer manufactured as described in Reference Example 3 was used. The physical properties of the coating layer of the power cable thus obtained were measured, and the results were shown in Table 2.

Comparative Example 3

The same operations as described in Example 9 were repeated except that 15 parts by weight of high-pressure low-density polyethylene and 1.1 part by weight of the same crosslinking agent as used in Example 7 were added to 85 parts by weight of the ethylene/1-hexene copolymer manufactured as described in Reference Example 3. The physical properties of the composition and the physical properties of the coating layer of the power cable thus obtained were measured, and the results were shown in Table 2.

Here, in Table 2, formulas (1) and (2) are the same as shown in Table 1, and formula (3) represents 400×d−244.

TABLE 2

| | Ex. 6 | Ex. 7 | Ex. 8 | Ex. 9 | Ex. 10 | Comp. Ex. 1 | Comp. Ex. 2 | Comp. Ex. 3 |
|---|---|---|---|---|---|---|---|---|
| Composition of insulating material (parts by weight) | | | | | | | | |
| Ethylene/α-olefin copolymer | 100 | 100 | 100 | 85 | 85 | 100 | 100 | 85 |
| High-pressure LDPE | 0 | 0 | 0 | 15 | 15 | 0 | 0 | 15 |
| Crosslinking agent | 0 | 1.1 | 1.1 | 1.1 | 1.1 | 0 | 0 | 1.1 |
| Physical properties of ethylene/1-hexene copolymer: | | | | | | | | |
| Density (g/cm$^3$) | 0.922 | 0.922 | 0.928 | 0.922 | 0.928 | 9.922 | 0.923 | 0.923 |
| MFR (g/10 min) | 1.0 | 5.0 | 7.5 | 5.0 | 7.5 | 1.3 | 4.9 | 4.9 |
| Melt tension (g) | 1.5 | 0.4 | 0.2 | 0.4 | 0.2 | 1.7 | 0.4 | 0.4 |
| Value of Formula (1) | 2.2 | 0.57 | 0.40 | 0.57 | 0.40 | 1.76 | 0.58 | 0.58 |
| Decane soluble matter content (%) | 0.9 | 1.0 | 0.70 | 1.0 | 0.70 | 1.72 | 1.60 | 1.60 |
| Value of Formula (2) | 1.3 | 1.3 | 0.76 | 1.3 | 0.76 | 1.30 | 1.19 | 1.19 |
| Melting point (° C.) | 119.2 | 120.0 | 122.4 | 120.0 | 122.4 | 121.8 | 122.4 | 122.4 |
| Value of Formula (3) | 120.8 | 120.8 | 123.2 | 120.8 | 123.2 | 120.8 | 121.2 | 121.2 |
| Mw/Mn | 2.5 | 2.5 | 2.6 | 2.5 | 2.6 | 8.5 | 8.7 | 8.7 |
| TREF insoluble matter content (%) (100° C.) | 4.5 | 4.0 | 5.2 | 4.0 | 5.2 | >10 | >10 | >10 |
| Physical properties of composition | | | | | | | | |
| Density (g/cm$^3$) | | | | 0.922 | 0.928 | | | 0.923 |
| MFR (g/10 min) | | | | 2.3 | 3.8 | | | 2.5 |
| Melt tension (g) | | | | 4.5 | 4.0 | | | 4.6 |
| Value of Formula (1) | | | | 1.01 | 0.72 | | | 1.02 |
| Decane soluble matter content (%) | | | | 1.2 | 0.85 | | | 1.51 |
| Value of Formula (2) | | | | 1.3 | 0.76 | | | 1.19 |
| Melting point (° C.) | | | | 119.6 | 121.9 | | | 122.9 |
| | | | | 111.0 | 112.0 | | | |
| Value of Formula (3) | | | | 120.8 | 123.2 | | | 121.2 |
| Mw/Mn | | | | 3.2 | 4.0 | | | 9.0 |
| Physical properties of coated layer: | | | | | | | | |
| Gel content (%) | 0 | 75 | 74 | 70 | 69 | 0 | 64 | 60 |
| Strength at break (MPa) | 20.1 | 28.4 | 26.8 | 27.9 | 25.0 | 15.8 | 14.8 | 14.5 |
| Elongation at break (%) | 600 | 500 | 520 | 550 | 590 | 490 | 380 | 390 |
| Taper wear (mg) | 8.0 | 7.0 | 7.2 | 6.4 | 6.9 | 16 | 19 | 18 |

Formulas (1) and (2) are the same as shown in Table 1; Formula (3) represents 400 × d − 244

Industrial Applicability of the Invention

In the invention, an insulating material comprising an ethylene/α-olefin copolymer whose molecular weight distribution, composition distribution and branches have been controlled properly is adopted for the coating layer. Because of this, the invention makes it possible to obtain a wire having a smooth appearance without surface roughness, while retaining the excellent electrical insulating properties, mechanical strength and wear resistance inherently possessed by polyethylene. Furthermore, the wire having a crosslinked coating layer shows excellent wear resistance, heat resistance and heat cycle characteristics.

Moreover, the insulating material having satisfactory extrudability makes high-speed extrusion possible, providing a high-productivity process for manufacturing wire.

Thus, the wire of the invention and the manufacturing process therefor provide preferably wires such as general wires, power cables and communication cables.

What we claim is:

1. A process for producing a wire, wherein a relationship between a resin pressure P (kg/cm$^2$), and a resin temperature T (° C.), an extrusion rate K (kg/hour), a lip cross-section area of extruder A (cm$^2$) and a melt flow rate of resin MFR (g/10 minutes) meets the following conditions when an insulating material is extrusion-coated onto a conductor or a conductor shielding layer:

$$100 \times \{K/(MFR)^{1.5}/(T-120)/A\}^{0.2} \leq P \leq 1000 \times \{K/(MFR)^{1.5}/(T-120)/A\}^{0.2}$$

wherein the insulating material comprising a copolymer of ethylene and an α-olefin having 3 to 20 carbon atoms, wherein the ethylene/α-olefin copolymer meets the following conditions (A) to (D):

(A) a density (d) is 0.880 to 0.950 (g/cm$^3$);
(B) a melt flow rate (MFR) is 0.01 to 20 (g/10 minutes);
(C) the relationship between decane soluble content (W (wt %)) at 23° C. and the density (d) is:
when MFR ≤ 10 (g/10 minutes), $$W < 80 \times \exp\{-100(d-0.88)\} + 0.1,$$

when MFR > 10 (g/10 minutes), $$W < 80 \times (MFR-9)^{0.26} \times \exp\{-100(d-0.88)\} + 0.1;$$

and (D) the relationship between a temperature (TM (° C.)) at a position of the highest peak of an endothermic curve as measured by a differential scanning calorimeter (DSC) and the density (d) is:

$$Tm < 400 \times d - 244.$$

2. A process according to claim 1, wherein the resin pressure satisfies the following conditions:

$$130 \times \{K/(MFR)^{1.5}/(T-120)/A\}^{0.2} \leq P \leq 800 \times \{K/(MFR)^{1.5}/(T-120)/A\}^{0.2}.$$

3. A process according to claim 1, wherein the resin pressure satisfies the following conditions:

$$200 \times \{K/(MFR)^{1.5}/(T-120)/A\}^{0.2} \leq P \leq 500 \times \{K/(MFR)^{1.5}/(T-120)/A\}^{0.2}.$$

4. A process according to claim 1, wherein after said insulating material is extrusion-coated onto the conductor or the conductor shielding layer, the coated layer is subjected to a crosslinking treatment.

5. A process according to claim 1, wherein said ethylene/α-olefin copolymer has a ratio (Mw/Mn) of its weight-average molecular weight (Mw) to its number-average molecular weight (Mn) of 2.0 to 15.

6. A process according to claim 1 or 5, wherein said ethylene/α-olefin copolymer content which is not extracted below 100° C. in a Temperature Rising Elution Fractionation Test (TREF) is not more than 10 wt %.

7. A process according to claim 1, wherein said ethylene/α-olefin copolymer further has at least one peak other than the highest peak in the endothermic curve as measured by the DSC.

8. A process according to claim 1, wherein said ethylene/α-olefin copolymer exhibits the following relationship between melt tension (MT (g)) at 190° C. and the melt flow rate (MFR (g/10 minutes)):

$$MT \leq 2.2 \times MFR^{-0.84}.$$

9. A process according to claim 1, wherein said ethylene/α-olefin copolymer exhibits the following relationship between melt tension (MT (g)) at 190° C. and the melt flow rate (MFR (g/10 minutes)):

$$MT > 2.2 \times MFR^{-0.84}.$$

10. A process according to claim 1, wherein said insulating material comprises 60 to 97 wt % of said ethylene/α-olefin copolymer and 3 to 40 wt % of a high-pressure low-density polyethylene.

11. A process according to claim 1, wherein said insulating material comprises 10 to 90 wt % of said ethylene/α-olefin copolymer and 10 to 90 wt % of a second ethylene/α-olefin copolymer, wherein said second copolymer satisfies the following conditions (i) to (v):

(i) a density (d) is 0.880 to 0.940 (g/cm$^3$);
(ii) a melt flow rate (MFR) is 3 to 60 (g/10 minutes);
(iii) a relationship between a melt tension (MT(g)) and the melt flow rate (MFR (g/10 minutes)) at 190° C. is:

$$MT > 2.2 \times MFR^{-0.84},$$

(iv) a relationship between a decane soluble matter content (W (wt %)) at 23° C. and the density (d) is:
when MFR ≤ 10 (g/10 minutes), $$W < 80 \times \exp\{-100(d-0.88)\} + 0.1,$$

when MFR > 10 (g/10 minutes), $$W < 80 \times (MFR-9)^{0.26} \times \exp\{-100(d-0.88)\} + 0.1;$$

and (v) a relationship between a temperature (Tm(° C.)) at a position of the highest peak of an endothermic curve as measured by a differential scanning calorimeter (DSC) and the density (d) is:

$$Tm < 400 \times d - 248.$$

12. A process according to claim 1, wherein said insulating material further comprises a crosslinking agent.

13. A process according to claim 12, wherein said crosslinking agent is a peroxide or a silane compound.

14. A process according to claim 12 or 13, wherein said insulating material is crosslinked.

15. A process according to claim 14, wherein said extrusion-coated layer comprising the crosslinked insulating material exhibits:

(1) a tensile strength of not less than 15 Mpa;
(2) a tensile elongation of not less than 400%; and
(3) a wear amount of not more than 15 mg as determined by a taper wear test method.

* * * * *